United States Patent
Chang

(10) Patent No.: US 8,599,501 B2
(45) Date of Patent: Dec. 3, 2013

(54) LENS MODULE

(75) Inventor: Chia-Chun Chang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 52 days.

(21) Appl. No.: 13/406,650

(22) Filed: Feb. 28, 2012

(65) Prior Publication Data

US 2013/0038953 A1 Feb. 14, 2013

(30) Foreign Application Priority Data

Aug. 10, 2011 (TW) .............................. 100128620 A

(51) Int. Cl.
*G02B 27/00* (2006.01)
*G02B 7/00* (2006.01)

(52) U.S. Cl.
CPC ..................................... *G02B 7/004* (2013.01)
USPC .......................................... 359/811; 359/818

(58) Field of Classification Search
CPC ........................................................ G02B 7/04
USPC .................................................. 359/811, 818
See application file for complete search history.

(56) References Cited

U.S. PATENT DOCUMENTS

| 2007/0076309 A1* | 4/2007 | Shimizu et al. | ............... 359/811 |
| 2009/0147381 A1* | 6/2009 | Chen | ............................. 359/819 |
| 2009/0213262 A1* | 8/2009 | Singh et al. | ................... 348/340 |

* cited by examiner

*Primary Examiner* — James Jones
(74) *Attorney, Agent, or Firm* — Altis & Wispro Law Group, Inc.

(57) ABSTRACT

A spacing ring is provided and includes a peripheral ring-shaped spacing portion and a light shading portion extending from an inner peripheral surface of the spacing portion. The spacing portion has a resisting surface. The light shading portion includes an inclined clamping surface connecting with the resisting surface of the spacing portion. The clamping surface and a central axis of the spacing ring cooperatively define an acute angle, the clamping surface and the resisting surface of the spacing portion cooperatively define an obtuse angle. A lens module using the spacing ring is also provided.

8 Claims, 2 Drawing Sheets

LENS MODULE

BACKGROUND

1. Technical Field

The present disclosure generally relates to a spacing ring and a lens module using the spacing ring.

2. Description of Related Art

A commonly used lens module generally includes a barrel, a first lens, a spacing ring and a second lens. The first lens and the second lens are separately assembled within the barrel. The spacing ring is assembled within the barrel and positioned between the first lens and the second lens, for spacing the first and second lenses thereby decreasing flare and stray lights during usage. However, the performance of the existing spacing ring may not be well, as the spacing ring is assembled within the lens module, and the flare and stray lights may still be generated which may affect the performance and imaging quality of the lens module.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

Figure 1:
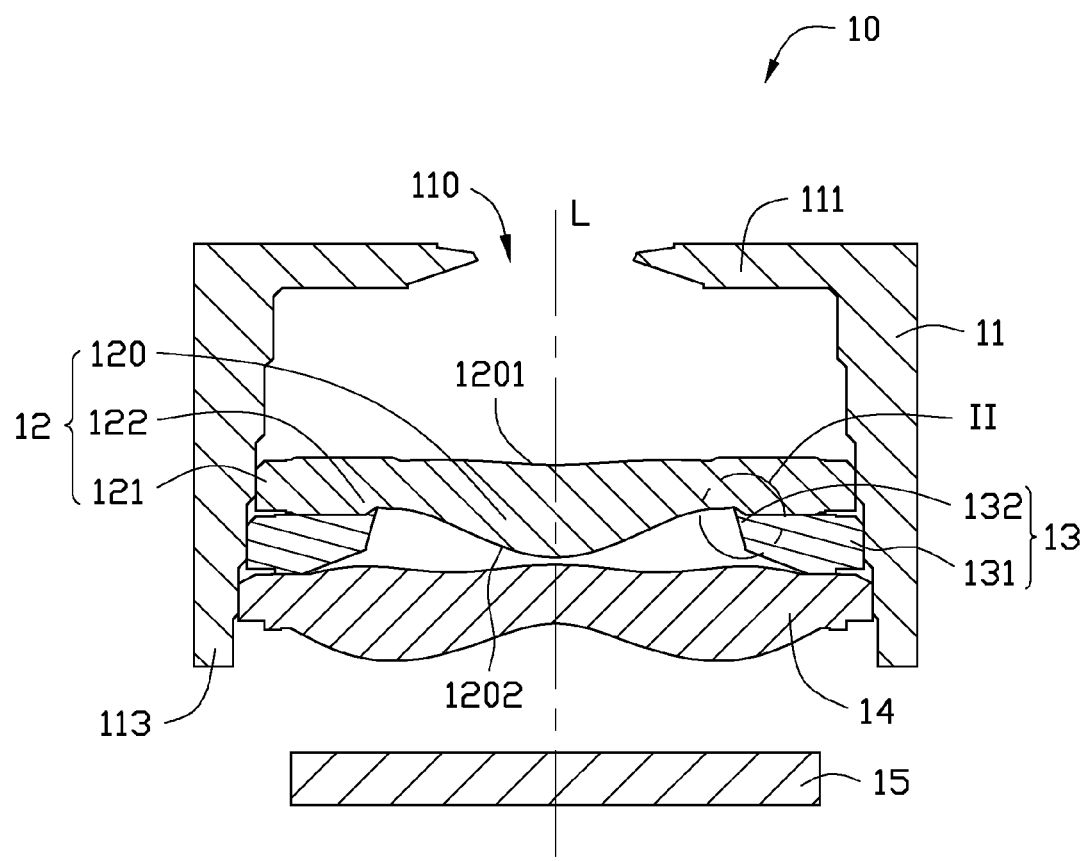
FIG. 1 shows a cross sectional view of an embodiment of a lens module.
Figure 2:
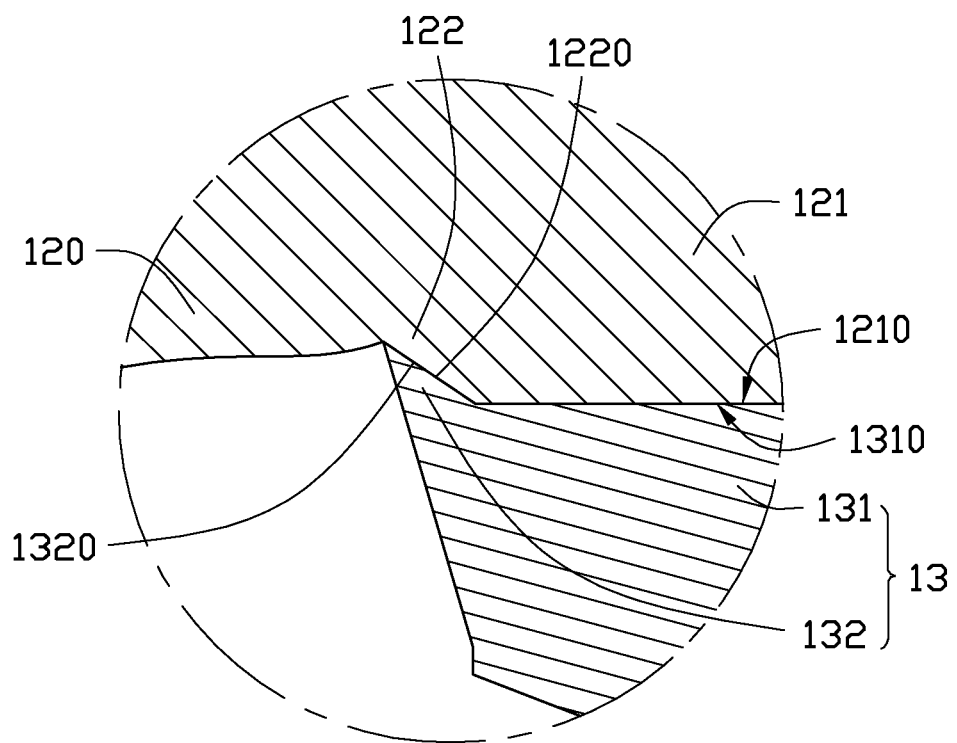
FIG. 2 shows an enlarged view of a circled portion II of the lens module of FIG. 1.

Referring to FIGS. 1 and 2, an embodiment of a lens module 10 is shown. The lens module 10 includes a barrel 11, a first lens 12, a spacing ring 13, a second lens 14 and an image sensor 15. The barrel 11 is a substantially hollow cylindrical tube having a semi-closed end 111 and an opening end 113 opposite to the semi-closed end 111. The semi-closed end 111 defines a light input opening 110 coaxially communicating with the inner space of the barrel 11.

The first lens 12 and the second lens 14 are separately assembled within the barrel 11 and positioned coaxial with the barrel 11 thereby having a same optical axis L. The second lens 14 is positioned adjacent to the opening end 113. The first lens 12 includes a central optical portion 120, a non-optical portion 121 surrounding the optical portion 120 and a connecting portion 122. The connecting portion 122 is positioned between the optical portion 120 and the non-optical portion 121 for connecting the optical portion 120 and the non-optical portion 121 together.

The optical portion 120 includes a first surface 1201 and a second surface 1202 opposite to the first surface 1201. In the illustrated embodiment, the second surface 1202 is an aspheric surface facing toward the adjacent second lens 14. The non-optical portion 121 includes a contact surface 1210 substantially perpendicular to the optical axis L. The connecting portion 122 includes an inclined connecting surface 1220 facing toward the spacing ring 13 and defines an acute angle with the optical axis L. The connecting surface 1220 forms an obtuse angle with the contact surface 1210. In an alternative embodiment, the first surface 1201 may also be an aspheric surface.

The spacing ring 13 is coaxially assembled within the barrel 11 and sandwiched between the first lens 12 and the second lens 14 thereby spacing the first lens 12 and the second lens 14. The spacing ring 13 includes a peripheral ring-shaped spacing portion 131 and a light shading portion 132 extending radially from an inner peripheral surface of the spacing portion 131.

The spacing portion 131 includes a resisting surface 1310 for supporting the first lens 12. In use, the resisting surface 1310 of the spacing portion 131 of the spacing ring 13 tightly contacts and resists against the corresponding contact surface 1210 of the non-optical portion 121. The resisting surface 1310 has a shape matching with the corresponding contact surface 1210 of the non-optical portion 121. In the illustrated embodiment, the resisting surface 1310 is a rough surface.

The light shading portion 132 includes a clamping surface 1320 connecting with the resisting surface 1310 of the spacing portion 131. The clamping surface 1320 is configured for tightly and completely engaging with the corresponding connecting surface 1220 thereby shading and blocking the connecting portion 122 of the first lens. In the illustrated embodiment, the clamping surface 1320 is an inclined surface having a surface structure matching with the corresponding connecting surface 1220 of the connecting portion 122. The clamping surface 1320 forms an acute angle with the optical axis L. The clamping surface 1320 defines an obtuse angle with the resisting surface 1310 of the spacing portion 131.

The image sensor 15 is coaxially assembled adjacent to a distal end of the barrel 11 away from the semi-closed end 111 and positioned adjacent to the second lens 14.

In use, the outer light enters into the light input opening 110 of the barrel 11, passes through the first lens 12 and the second lens 14 in that order, and then finally forms an image on the corresponding image sensor 15. The interspace formed adjacent the connecting surface 1220 of the connecting portion 122 of the first lens 12 is tightly filled in by the light shading portion 132 of the spacing ring 13, thus, it efficiently prevents the flare and stray lights from generating and entering into the image sensor 15 of the lens module 10 during usage.

In another alternative embodiment, the number of the lenses is not limited to two, the lens module 10 can also include more than two lenses.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A lens module, comprising:
   a barrel;
   a first lens coaxially assembled within the barrel, the first lens comprising a central optical portion, a non-optical portion surrounding the central optical portion, and a connecting portion positioned between the central optical portion and the non-optical portion for connecting the central optical portion and the non-optical portion together; the non-optical portion having a contact surface, the connecting portion having an inclined connecting surface, the inclined connecting surface and the contact surface define an obtuse angle;
   a second lens coaxially assembled within the barrel and positioned adjacent to the first lens, the second lens having an optical axis same as an optical axis of the first lens; and
   a spacing ring coaxially assembled within the barrel and sandwiched between the first lens and the second lens thereby spacing the first lens and the second lens, the spacing ring comprising:
      a spacing portion having a resisting surface tightly contacting and resisting against the contact surface of the non-optical portion corresponding to the spacing ring, the spacing portion being peripheral ring-shaped; and a light shading portion extending from an inner peripheral surface of the spacing portion, the light shading portion comprising an inclined clamping surface connecting with the resisting surface, the inclined clamping surface tightly engaging with the inclined connecting surface of the first lens corresponding to the spacing ring, wherein, the inclined clamping surface and a central axis of the spacing ring cooperatively define an acute angle, the inclined clamping surface and the resisting surface of the spacing portion cooperatively define an obtuse angle, the inclined clamping surface forming an obtuse angle with the resisting surface of the spacing portion, the inclined clamping surface having a surface structure matching a surface structure of the inclined connecting surface of the connecting portion corresponding to the spacing ring.

2. The lens module of claim 1, wherein the resisting surface is a rough surface.

3. The lens module of claim 1, wherein the resisting surface has a shape matching a shape of the contact surface of the non-optical portion corresponding to the spacing ring.

4. The lens module of claim 1, wherein the central optical portion comprises a first surface and a second surface opposite to the first surface, the second surface is an aspheric surface facing toward the second lens adjacent to the first lens.

5. The lens module of claim 4, wherein the contact surface of the non-optical portion is substantially perpendicular to the optical axis of the first lens and the second lens.

6. The lens module of claim 4, wherein the first surface is an aspheric surface.

7. The lens module of claim 4, wherein the barrel is a substantially hollow cylindrical tube comprising a semi-closed end and an opening end opposite to the semi-closed end, the semi-closed end defines a light input opening coaxially communicating with an inner space of the barrel; the second lens is positioned adjacent to the opening end of the barrel.

8. The lens module of claim 7, wherein the lens module further comprises an image sensor coaxially assembled adjacent to a distal end of the barrel, away from the semi-closed end and positioned adjacent to the second lens.

* * * * *